United States Patent [19]

Stepan et al.

[11] Patent Number: 4,621,814
[45] Date of Patent: Nov. 11, 1986

[54] AMUSEMENT DEVICE HAVING JUXTAPOSED VIDEO DISPLAYS

[75] Inventors: Donald C. Stepan, Reno, Nev.; Dan J. Waller, Truckee, Calif.; J. George Drews, Reno, Nev.

[73] Assignee: IGT, Reno, Nev.

[21] Appl. No.: 614,401

[22] Filed: May 24, 1984

[51] Int. Cl.$^4$ .......................... H04N 5/64; A63F 9/22
[52] U.S. Cl. .......................... 273/138 A; 273/DIG. 28
[58] Field of Search ................. 312/7.2; 358/254, 245, 358/104, 87; 273/DIG. 28, 142, 138

[56] References Cited

U.S. PATENT DOCUMENTS 3,887,766 6/1975 Caswell .......................... 358/245
4,084,194 4/1978 Hector .......................... 273/DIG. 28

FOREIGN PATENT DOCUMENTS 1524120 4/1968 France .......................... 358/254
560548 4/1957 Italy .......................... 358/254

Primary Examiner—Richard C. Pinkham
Assistant Examiner—MaryAnn Stoll Lastova
Attorney, Agent, or Firm—Townsend and Townsend

[57] ABSTRACT

A device useful in allowing two or more video gaming devices to be placed in a common cabinet, thus reducing floor space requirements and thereby improving profit yield per square foot in a gaming establishment or casino. Cabinet configuration includes mirror image cabinet halves, each of which includes a recess in which a game actuating handle may be located. The recess thereby eliminates the need for spacing of gaming device cabinets, when placed side by side. Mirror image configuration allows the games to be placed facing in any desired direction. Cooperation of a baffle and collar electromagnetically isolates a cathode ray tube (CRT) display in each gaming device one from the other to prevent display interference with and from the CRTs. Thus, the invention allows the placement of independent video displays in close proximity, preferably within a common cabinet.

2 Claims, 3 Drawing Figures

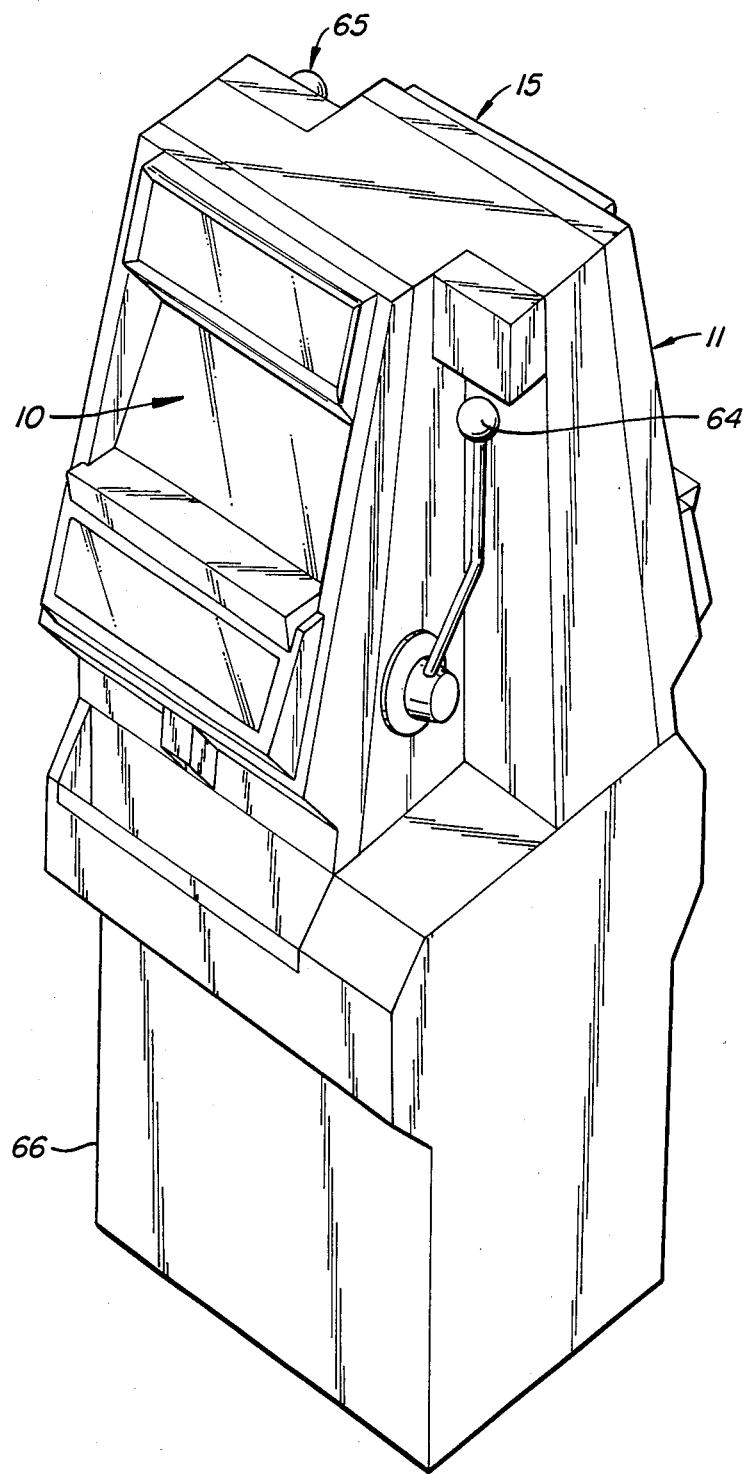
FIG._1.

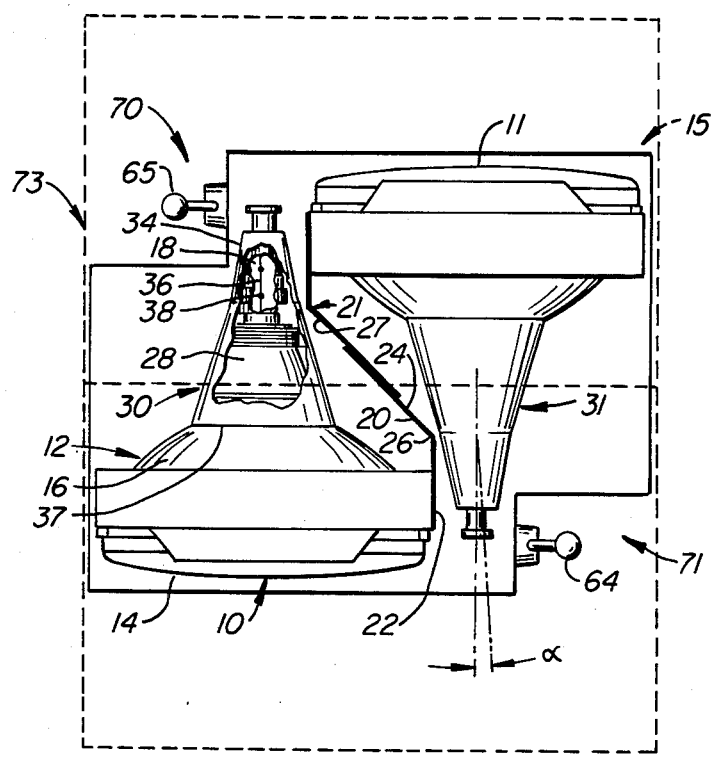
FIG._2.
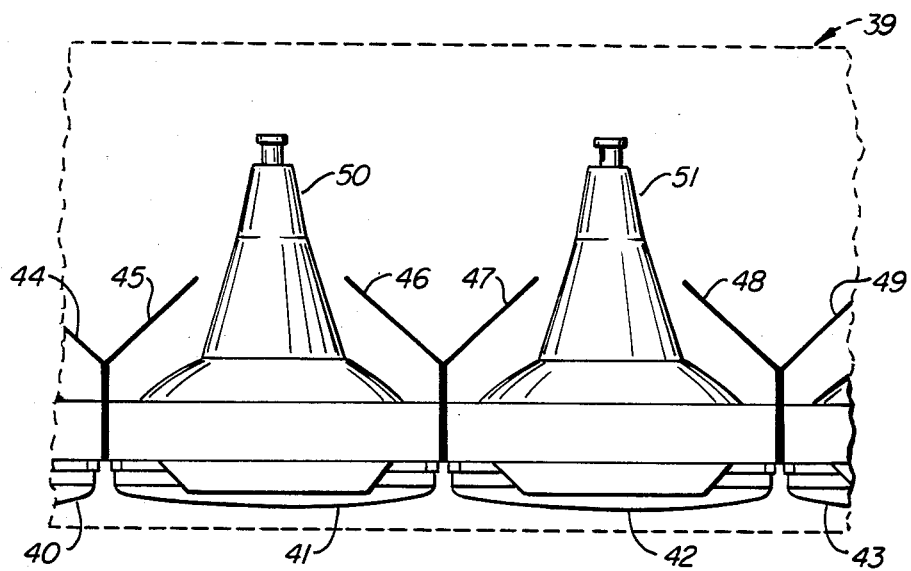
FIG._3.

AMUSEMENT DEVICE HAVING JUXTAPOSED VIDEO DISPLAYS

BACKGROUND OF THE INVENTION

1. Field of the Invention

The present invention relates to video gaming devices. In particular, the present invention relates to side-by-side placement of video gaming devices in close proximity, one to the other.

2. Description of the Prior Art

Video amusement and gaming machines, such as video slot or poker machines, are becoming ever more popular due to their sophistication and attractiveness. In modern casinos one can find row after row of video gaming machines. Prior art video gaming machines are housed in conventional cabinets each with a cathode ray tube (CRT) or TV-monitor having a video screen prominently located at the front of the machine. The sides and back of the cabinet are closed and may include openings or doors to provide access to the interior. Video slot machines typically also include a pull handle on one side. The machines are installed side by side, with an appropriate spacing between the machines for any side-mounted handles that may be present. Frequently, two machines are placed back-to-back to form double rows of machines and appropriate passageways which provide space for players and foot traffic.

Video displays incorporating cathode ray tubes (CRTs) form images from individual picture elements (pixels) arranged side-by-side in a series of parallel lines. Various signals are produced to control the formation of a displayed image, including horizontal and vertical scanning signals, video signals, and color signals (where appropriate). These signals form the image by turning a beam of electrons on and off (or three beams in a color display) while electromagnetically bending the beam to move it back and forth, and up and down across a CRT phosphor or video screen.

The various signals used to control the electron beam in a CRT are of a magnitude sufficient to radiate beyond the confines of the CRT itself. Such radiation has heretofore been restricted within the boundaries of the video display cabinet. However, with the increased use of microprocessors and computer driven devices, video displays have become more and more prominent. As a result, the need arises to save space by placing video displays closer and closer together.

Two factors limit the extent to which devices employing CRTs in general and video gaming machines in particular could be moved closer together. The first limitation is the width of the cabinet housing the video screen, i.e. the cabinet must necessarily be wider than the width of the screen and it must have a depth which at least nominally exceeds the overall length of the CRT.

Secondly, by moving the CRTs closer and closer together, annoying interference and crosstalk of increasing magnitude between them are produced. An example of such interference can be observed in retail stores where television sets are sold. Typically, dozens of such television sets are arrayed on a series of shelves. An effort is made in such stores to keep all of the television sets tuned to the same channel to mitigate, and thereby mask the effects of interference between the television sets. Such interference results from radiation emitted by the sets due to their close proximity.

Operators of gaming establishments, such as casinos, are subject to vigorous competition amongst each other as well as from competing industries such as state or privately operated lotteries, state authorized race betting, etc. They are also subject to stringent governmental regulations. For example, the state of New Jersey requires a particular number of square feet of nongaming space to be provided by the operator of a gambling establishment for each square foot of gaming space within the establishment. Thus, the fewer gaming devices per square foot, the lower the profit per square foot, and vice versa. For the operator of a gaming establishment it is therefore highly desirable to increase the density of gaming devices on the available gaming floor space. In this regard, however, there has been very little progress in the past. The overall physical size of gaming devices has remained substantially constant. It is believed that among the factors which have prevented an increase in the density of video gaming machines on the available gaming floor space has been the above-mentioned interference problem between CRTs located in close proximity.

SUMMARY OF THE INVENTION

A first aspect of the present invention contemplates to greatly increase the compactness of devices, such as the above-mentioned video gaming or amusement machines, by placing two CRTs end-to-end in overlapping or juxtaposed relationship in a single cabinet. In such a video gaming machine, the monitors face in opposite directions and they are laterally offset just enough so that the respective necks of the CRTs clear each other and can be placed side by side. Each side of the machine is a mirror image of the other so that the machines can be positioned to face in any desired direction. This is of importance for operators of gaming establishments in instances in which the two sides of the machine house different games, for example. In addition, it facilitates the installation of the machine on the gaming floor.

In a preferred embodiment of the invention, the lateral offset of the two back-to-back monitors is used to incorporate a recess in each half of the cabinet which can accommodate a pull handle, for example. Thus, space that had to be provided in the past between adjacent video gaming machines to provide room for and access to a handle is no longer necessary. Accordingly, gaming floor space required for the machine is reduced.

A video gaming machine constructed as summarized in the preceding paragraphs has a width of no more than about 24 inches, which is essentially the same as conventional single video gaming machines, and a depth of no more than 25 inches, which is only about 5 inches more than the depth of a conventional single video gaming machine. This translates into a floor space savings of about 40% as compared with the floor space occupied by two prior art video gaming machines. For expensive gaming floor space, such as in New Jersey where each square foot of gaming floor space requires the provision of three square feet of non-gaming floor space, the floor space savings alone can result in annual savings of up to $36,000.00 as compared with the cost of providing floor space for two conventional video gaming machines.

A second aspect of the invention relates to the above-mentioned elimination of interference between closely adjacent CRTs whether the CRTs are mounted side-by-side, as closely as the width of their screens permits, canted relative to each other so that the axes of the CRTs are angularly inclined with respect to each other, say by 45°, 60° or 90°, or end to end and interleaved, as above described, to minimize the width and/or depth required by the CRTs, irrespective of whether the CRTs are in a common cabinet or in separate, adjoining cabinets. Under certain circumstances, such interference between closely adjacent CRTs can be eliminated by synchronizing the single generating circuits of the adjacent monitors. Frequently, such an approach can complicate the operation and maintenance of the CRTs and can add significantly to their manufacturing and installation costs. Significantly, this approach is often not available because of an inability to synchronize independent but adjacent monitors. In addition, as far as video gaming machines are concerned, some gaming regulatory agencies require for security purposes that each electronic gaming device be totally independent of all other such devices and, therefore, have its own independent synchronizing, clocking and controlling circuitry.

Accordingly, in a preferred embodiment of the present invention, interference between closely adjacent video monitors is greatly reduced or eliminated by providing a ferro-magnetic baffle that extends along a CRT bell between each of the display CRTs. The baffle is preferably produced of a ferro-magnetic or other metallic alloy. The baffle preferably follows the contour of the CRT bell and, thus, includes a first portion which extends along a CRT screen edge perpendicular to the edge. A crease or bend in the baffle demarks the ending of a first baffle panel and beginning of a second baffle panel which is positioned at and extends substantially along the CRT bell parallel therewith. Both baffle panels form a solid and continuous electromagnetic shield.

The present invention typically also includes a tubular collar that is coaxial with and surrounds the neck or gun of the CRT. Preferably, at least a portion of the collar overlaps the baffle. The collar may include a cone-shaped segment that extends along the CRT neck and over a yoke of the neck to shield the yoke and thus restrain what would otherwise be interfering radiation produced by the yoke. By providing the collar with a conical shape its space requirements are minimized.

To facilitate the nesting of the collar when the video monitors are positioned end to end and interleaved, the collar can include a tapered and oblong end that extends along the rear of the CRT neck. Any longitudinal collar seam that may be present is oriented so that it faces away from the adjacent CRT, i.e. downwardly to minimize the escape of radiation which could interfere with adjacent displays.

Accordingly, the baffle and collar of the present invention cooperate to provide an electromagnetic shield that prevents interference between closely adjacent, juxtaposed CRTs.

DESCRIPTION OF THE DRAWINGS

FIG. 1 is a perspective view of a video gaming device having opposite facing displays within a common cabinet according to the preferred embodiment of the present invention;

FIG. 2 is a top plan view of the preferred embodiment of the present invention; and FIG. 3 is a top plan view of another embodiment of the invention showing a side-by-side display configuration.

DETAILED DESCRIPTION OF PREFERRED AND ALTERNATE EMBODIMENTS

A cabinet 15 includes two independent gaming machines having displays 10 and 11 (FIG. 1). The gaming devices are mirror images and, as such, allow the devices to be positioned facing in any desired direction. In the preferred embodiment, the displays are tilted approximately fourteen degrees to allow them to be easily viewed by a game user. The game cabinet is supported on a pedestal 66. The amount of display tilt is a function of display height and, therefore, of pedestal height. Pivotal handles 64 and 65, included in gaming devices, such as electronic slot machines, are positioned within recesses 70 and 71 defined by lateral offset of the displays within cabinet 15. Positioning the handles within the recesses eliminates the need for side by side spacing between adjacent machine cabinets and thus serves to reduce floor space requirements.

Display 10 includes a cathode ray tube (CRT) 12 which has a display surface 14, a bell 16, and a neck 18 (FIG. 2). Cathode ray tubes require strong electromagnetic fields to deflect and, thus control an electron beam. Such fields are produced by supplying appropriate signals to a large electromagnet, positioned on the CRT neck, such as a yoke 28. The electron beam is turned on and off in such manner that, as it is deflected by the changing electromagnetic field, an image is formed on the display surface.

A baffle 20, made of a ferro-magnetic metal, such as cold rolled steel or mu metal, is interposed between the two juxtaposed displays 10 and 11. The baffle includes a first planar panel 22 which extends along the CRT screen, substantially perpendicular thereto. The baffle is folded at a crease 26 to allow a second planar panel 24 to extend along a CRT bell 16, substantially parallel thereto. Thus, the baffle closely follows the contours of the CRT and confines radiation to within the limits of the CRT while taking up only a minimal amount of space.

A tubular collar 30, in the preferred embodiment having a conical shape, is positioned coaxial with and surrounding yoke 28 and CRT neck 18 and shields the yoke. A collar end 34 is given a tapered and oblong, almost rectangular shape to provide a compact shield that allows multiple displays to be located in a common cabinet, the necks of their CRTs interleaved, to minimize space requirements.

Collar 30 is secured to CRT bell 16 at an edge 37 by a silicone sealant in the preferred embodiment of the invention. The collar is formed from a sheet of ferromagnetic metal, such as cold rolled steel, mu-metal or an alloy marketed and commonly available under the brand name "Kinetic AA" which, up to now, has yielded the best results. Such material is difficult to weld and the collar, thus, may include overlapping edges at a seam 36 which are held together by fasteners, such as rivets 38. The seam is positioned at a bottom of the CRT neck to limit any radiation that may leak therethrough to that part of the CRT's enclosure where interference with adjacent CRTs is least likely. The metal from which the baffle and the collar are made may be heat treated in a manner that affects the polar alignment of the molecules in the metal and, thus, provides a more effective shield.

In FIG. 2, displays 10 and 11 are shown side-by-side and facing opposite directions within cabinet 15. Each display includes a baffle 20 and 21, respectively. The baffles are placed between the two displays to both contain excess radiation within the confines of the CRT associated with the display and to prevent stray radiation from penetrating within the CRT and thereby degrade the image produced by the display.

Displays 10 and 11 both include collars 30 and 31, respectively. The collars are configured as shown to enable the displays to be placed close together. Thus, baffles 21 and 22 include creases 26 and 27 that allow the baffles to follow the contours of the CRTs. The collar end has a vertical dimension that is longer than its horizontal dimension to enable the displays to be placed in a nesting configuration as closely together as is possible, in some applications practically in physical contact with each other, with the CRT necks interleaved. In the preferred embodiment of the invention, the CRTs are also canted (angle "α") approximately two-to-six degrees to allow them to be placed closer together and thus further minimize space taken up by the double gaming machine and increase the available depth of recesses 70, 71.

In FIG. 3, displays 40–43 are shown side by side at a common location 39, which may be a rack or enclosure. The present invention may be provided with anu number of colocated, juxtaposed displays and is not limited to the number shown in the figures. Nor is the display configuration necessarily limited to side by side placement. Rather, the displays may be stacked vertically or angularly offset, say be 45°, 60°, or 90°, to form a circular or semi-circular carousel.

Displays 40–43 include baffles 44–49. The baffles are positioned between adjacent displays to both shield the displays from interference and to prevent the displays from producing excess electromagnetic radiation that might be a source of interference.

Displays 40 and 43 are partially shown in the Fig. Displays 41 and 42 are shown including collars 50 and 51. The collars and baffles overlap to provide complete and effective shielding of the CRTs associated with each display.

Accordingly, the present invention allows displays to be colocated and juxtaposed without interfering one with the other. The present invention also allows the displays to operate independently one from the other which is of significant importance in applications relating to gaming. Independent operation of two or more games within a common cabinet satisfies the security requirements attendant with operation of such devices in a gaming environment, such as gaming establishment or casino.

Additionally, placement of displays in as close proximity as is possible by use of the present invention allows two gaming devices to be placed in a cabinet occupying substantially less floor space than is required by a single gaming device. The saved floor space is shown in FIG. 2 by the difference between dotted line 73, which indicates the floor space occupied by two prior art gaming devices, and the solid outline of the cabinet 15 of the present invention.

We claim:
1. A video amusement apparatus comprising:
   first and second cathode ray tubes each forming part of an independent amusement device and each having a video screen;
   a housing including first and second oppositely oriented housing faces and mounting the cathode ray tubes so that the screens are located at the faces and are oriented in opposite directions, the housing defining first and second housing halves, each of which includes a housing face, wherein the housing halves are of substantially equal widths and are laterally offset so that a portion of each housing half extends laterally past a side of the other housing half to thereby define a recess adjacent each said side; and
   means for operating each amusement device and positioned in the respective recesses.
2. A video amusement apparatus according to claim 1 wherein the means for operating comprises pivotally mounted pull handles.

* * * * *